June 7, 1955  R. J. WOODS  2,709,947
AIRCRAFT AND ARMAMENT THEREFOR
Filed March 10, 1949  2 Sheets-Sheet 1
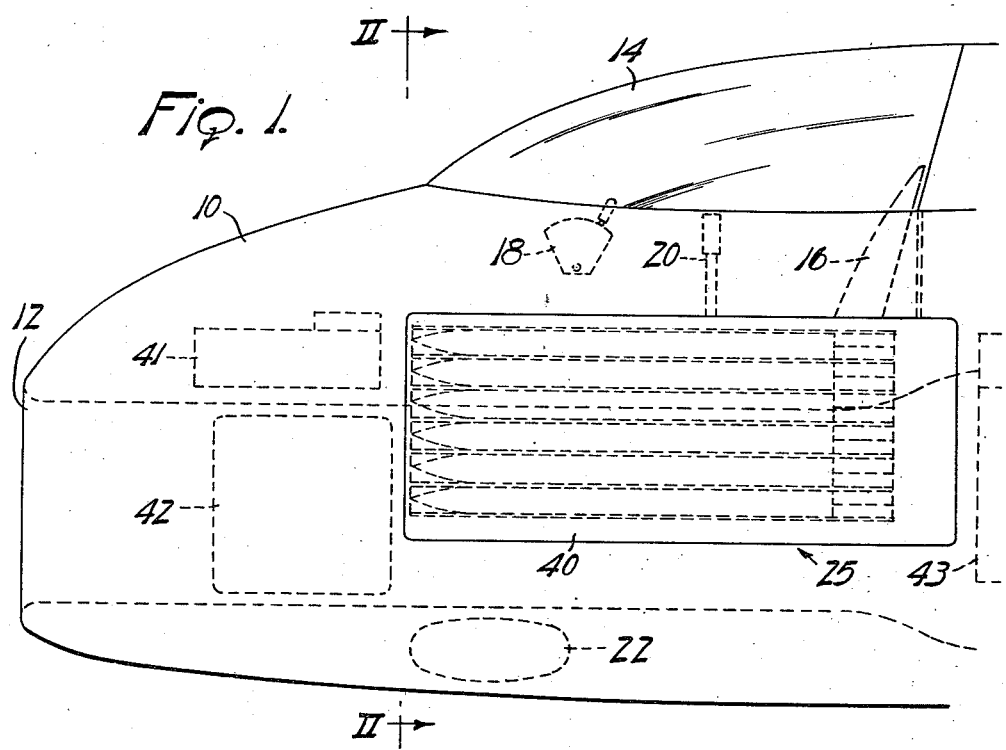
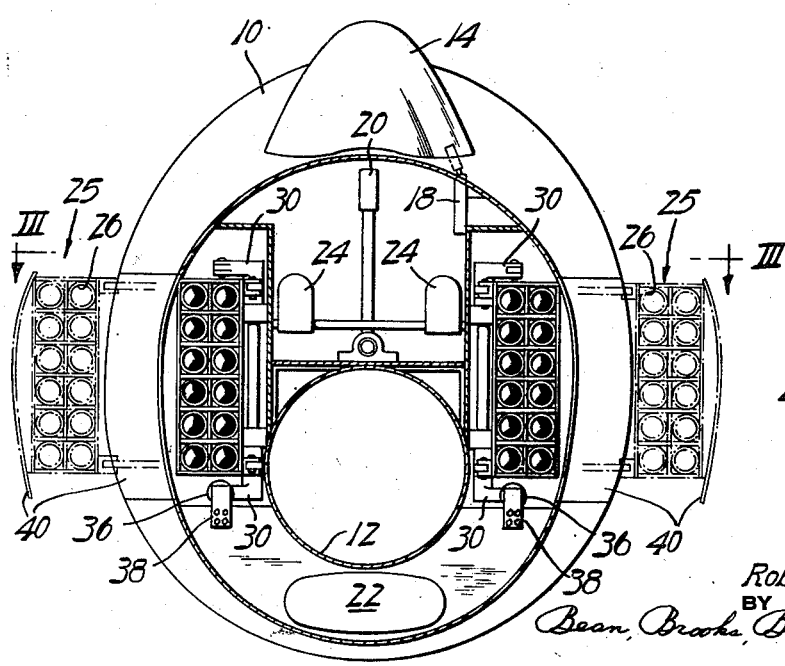
INVENTOR
Robert J. Woods
BY
Bean, Brooks, Buckley & Bean.
ATTORNEYS June 7, 1955   R. J. WOODS   2,709,947
AIRCRAFT AND ARMAMENT THEREFOR
Filed March 10, 1949   2 Sheets-Sheet 2
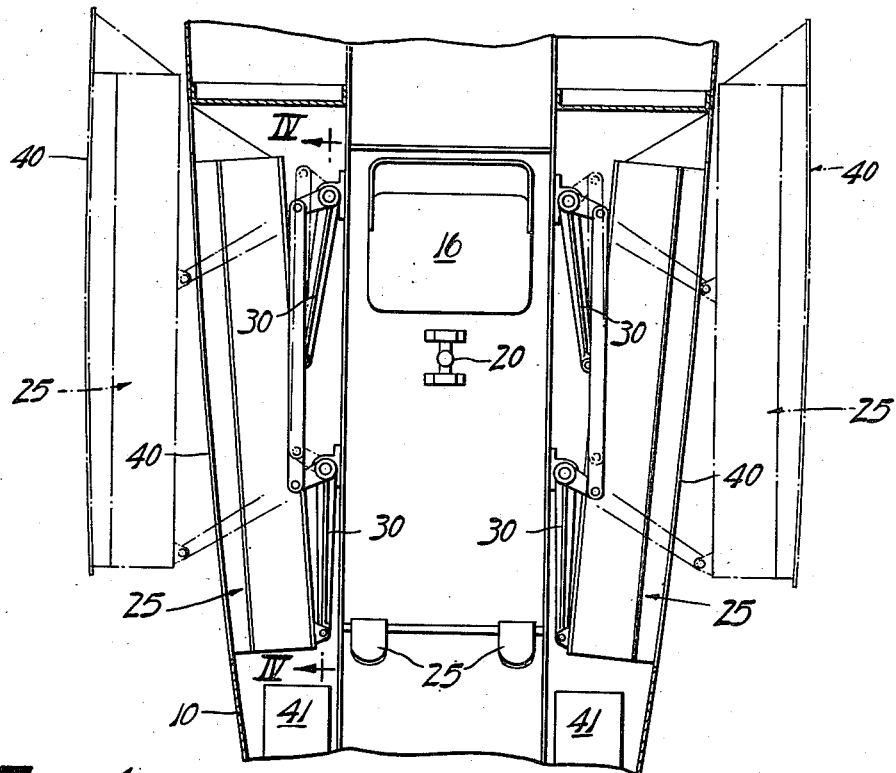
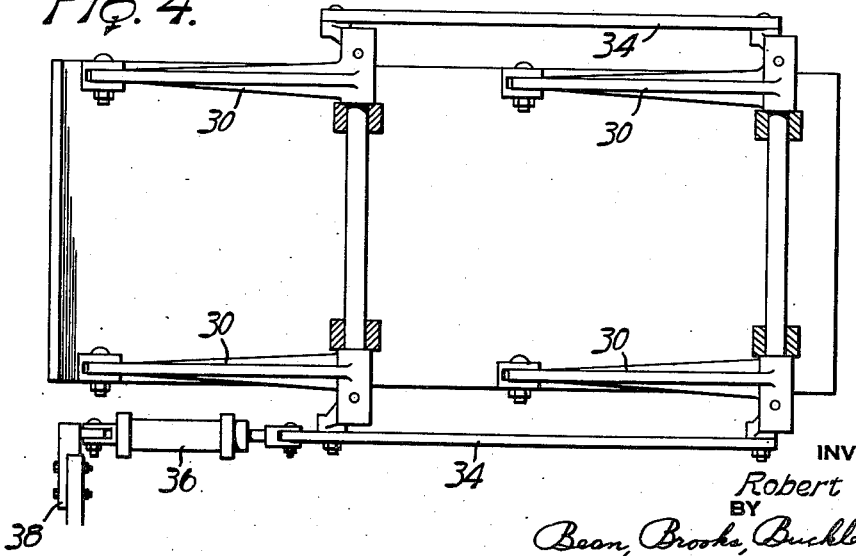
INVENTOR
Robert J. Woods
BY
Bean, Brooks, Buckley & Bean.
ATTORNEYS United States Patent Office 2,709,947
Patented June 7, 1955

2,709,947

AIRCRAFT AND ARMAMENT THEREFOR

Robert J. Woods, Grand Island, N. Y., assignor to Bell Aircraft Corporation, Wheatfield, N. Y.

Application March 10, 1949, Serial No. 80,626

7 Claims. (Cl. 89—1.7)

This invention relates to combat aircraft, and more particularly to improved armament and speed control means for such aircraft.

It is one of the objects of the invention to provide an improved armament mounting arrangement in aircraft, whereby such armament may be normally disposed within the structural profile of the aircraft with improved facility and results.

Another object of the invention is to provide an armament mount arrangement in aircraft whereby the armament may be stowed when inoperative within the aircraft structural profile in such manner as to occupy minimum space therewithin; while being projectable therefrom into position externally of and clear of the aircraft for training and firing upon a target with improved facility.

Another object of the invention is to provide an armament mount arrangement in aircraft whereby the armament may be stowed when inoperative within the aircraft structural profile so as to occupy minimum space therewithin, while being extensible therefrom into firing position externally of the aircraft profile with improved facility while the same time functioning as a flight speed reducing means of improved character.

Another object of the invention is to provide in an arrangement as aforesaid, improved armament carriage extension-retraction means.

Another object of the invention is to provide in an aircraft an armament carriage which is movable between extended and retracted positions relative to the aircraft structural profile; said carriage mechanism being arranged with improved facility relative to the adjacent airstream forces.

Another object of the invention is to provide in an aircraft an improved combination armament rack and air brake device.

Other objects and advantages of the invention will appear from the specification hereinafter.

In the drawing:

Fig. 1 is a fragmentary side elevation of a combat aircraft embodying the invention;

Fig. 2 is a section taken along line II—II of Fig. 1;

Fig. 3 is a section taken along line III—III of Fig. 2; and

Fig. 4 is a section taken along line IV—IV of Fig. 3.

It is generally known that fighter aircraft often employ air brake devices in the form of flaps and the like which are extensible from the normal aircraft structural profile so as to reduce flight speed, such as after overtaking a target to prevent overrunning the target and to permit an attack of longer duration. Similarly, dive bombing tactics usually contemplate employment of such air brake devices so that the craft may perform at maximum speed while en route, while being able to slow down the speed of the attack dive so as to prolong the time available for training the armament on the target. It is also well known that in a given aircraft design the attainable flight speed increases upon decrease of the frontal area of the aircraft.

The present invention contemplates a combat airplane which is normally of minimum frontal area and houses within the structural profile thereof combat armament such as cannon, rocket launchers, machine guns, bombs, or the like. Whereas, conventionally such armament is mounted in an aircraft so as to require that the space within the aircraft fuselage ahead of such armament be unoccupied so as to avoid interference with the discharge of the armament; in the case of the present invention the armament is carried upon carriage means arranged to laterally displace the armament between stowed positions within the aircraft body and extended positions externally of the aircraft body and in the adjacent airstream. Thus, the armament and carriage mechanisms are at the same time disposed for firing at positions free from interferences by other portions of the aircraft and are positioned in the adjacent airstream so as to function effectively as air brake means for the aircraft.

Thus, in aircraft of the invention it is required that the armament stowage space within the aircraft structure need be no larger than the actual size of the armament unit, and the stowage space may be located at any desired station longitudinally of the aircraft without requiring that the spaces ahead or behind the armament space be left open and unoccupied for permitting firing of the armament therethrough. The aircraft also possesses the advantage of combining minimum normal frontal area for maximum flight speed as during approach and retreat from a target; with the advantage of projection of the armament carriage into the adjacent airstream upon arrival at the target whereby the armament is then disposed to fire clear of the aircraft structure while the carriage and armament devices act as airbrake means retarding the aircraft speed so as to permit improved training of the armament and extend the duration of the attack.

More specifically, the invention contemplates carriage actuating means which automatically shift the attitude of the armament group incidental to displacements thereof between extended and retracted positions relative to the aircraft body, to permit both accurate aiming of the armament and maximum use of the available armament stowage space within the aircraft body. The invention is illustrated in the drawing in conjunction with a high speed fighter aircraft of the jet engine type, but it will be understood that the invention is equally applicable to other type aircraft.

In the drawing the aircraft is illustrated as comprising a fuselage 10 having an engine air inlet duct 12; cockpit canopy 14; pilot seat 16; throttle control 18; and flight surface control stick 20. The nose wheel is illustrated as being in retracted position within the fuselage as is indicated at 22. In Fig. 2 the rudder control pedals are indicated at 24.

The aircraft armament is illustrated to include a pair of rocket racks which are designated generally at 25—25; the racks comprising box-like structures internally partitioned and mounting a plurality of rocket launching tubes 26 in parallel relation. The racks are so constructed and arranged as to support the rocket launching tubes so as to extend generally parallel to the thrust axis of the airplane. The airplane fuselage 10 is constructed to provide a pair of rectangular compartments, one at each side of the fuselage, at any convenient station longitudinally of the airplane and of such size and shape as to accommodate the armament racks 25 in nested relation therein as shown in solid lines in Figs. 2–3.

The racks are mounted upon the airplane by means permitting displacement of the racks laterally into the airstream externally of the fuselage; and such a mechanism is illustrated in Figs. 2–3–4 to comprise a system of bell cranks 30 which are mounted upon the fuselage to pivot about vertical axes while holding the armament racks 25 in suspended relation thereon at the swinging arm portions of the bell cranks. Thus, the bell crank and armament rack organization comprises in plan view a "parallelogram linkage" type support permitting the racks to swing outwardly from their compartments within the fuselage into the airstream externally thereof, as illustrated by the broken line showings of the armament racks in Figs. 2–3. As shown in Figs. 3–4, the bell cranks 30 are interconnected by tie rods 34, and a hydraulic jack 36 is shown as being in operable connection with the bell crank system for causing the armament racks to swing between retracted and extended positions as explained hereinabove.

Thus, it will be understood that in response to pilot control of the hydraulic jack the armament racks will be caused to swing in and out relative to their stowage compartments at opposite sides of the airplane fuselage; and it is contemplated that the single hydraulic jack 36 may be arranged to simultaneously actuate both of the armament racks at opposite sides of the airplane, as by means of the interconnection linkage indicated at 38 (Fig. 4). Therefore, it will be appreciated that when the airplane is operating under non-combat and high speed flight conditions, the armament racks will be maintained in stowed position within the confines of the fuselage, in order to produce minimum resistance to flight motion through the air. The outer wall portions of the armament racks are preferably formed by streamlined sheet metal elements designated 40 which are shaped to align in all directions with adjacent portions of the aircraft fuselage skin when the armament racks are in retracted position. However, upon operation of the bell crank system to cause the armament racks to swing outwardly from the aircraft, the racks and the armament devices therein will be thereby projected in unison at opposite sides of the airplane into the airstream; with the result that the projected structures will then provide substantial drag and will operate to materially reduce the speed of flight. At the same time, the armament devices will be thereby disposed clear of any interferences with aircraft structural parts disposed forwardly thereof; whereby the armament may now be fired in the direction of airplane flight without damage to the airplane structure.

A further feature of the arrangement of the invention resides in the specific bell crank system referred to hereinabove. It will be noted from the drawing that the bell crank system is so arranged that the airstream drag forces acting against the armament racks as they project into the adjacent airstream tend to pull rearwardly upon the racks in such manner as to assist in bringing them out into fully extended positions. Hence, the rack power unit need be of only minimum capacity, because in the case of rocket type armaments, for example, after the rockets are fired the rack devices are thereby emptied and the ambient airstream is thereby permitted to flow through the rack device so as to develop only a fraction of the drag that existed thereon while the rack was loaded. Therefore, substantially less power is required to swing the racks inwardly and forwardly to their stowed position within the fuselage after they are emptied. Incidentally, emptying of the armament load from the racks also automatically reduces the air brake effects thereof, and as a consequence thereof the airplane automatically begins to pick up speed again as soon as the rockets are fired even though the racks may not yet be completely retracted into the fuselage.

Also, particular attention is called to the fact that the bell crank system is so arranged as to automatically shift the attitude of the rack structures relative to the thrust line of the airplane while swinging the racks between retracted and extended positions. Thus, for example, as shown in Fig. 3, the bell crank system operates automatically to stow the racks within the fuselage in relatively non-parallel relation so that the racks are disposed parallel to the converging side walls of the fuselage skin. This avoids waste of valuable space within the fuselage, and yet when the racks are swung outwardly into firing positions the bell crank system automatically operates to alter their relative attitudes so that when the racks are in firing position they are substantially parallel to one another and to the thrust line of the airplane. Thus, the armament mounted upon the racks may be accurately aimed by simply aiming the airplane at the target.

As stated hereinabove, it is a particular advantage of the present invention that the armament racks may be stowed within the fuselage at any convenient station longitudinally of the airplane without requiring that the space within the fuselage ahead of the armament groups be kept open to avoid interference with firing of the armament. For example, as illustrated in Figs. 1–3, the spaces ahead of and behind the armament compartments within the fuselage may be usefully employed to house aircraft components such as are indicated at 41—42—43.

Although only one form of the invention has been shown and described in detail it will be apparent to those skilled in the art that the invention is not so limited but that various changes may be made therein without departing from the spirit of the invention or the scope of the appended claims.

I claim:

1. In an aircraft, a body portion comprising a housing, a rocket rack including multiple rocket launching tubes, means mounting said rack upon said aircraft to move from a stowed position within said housing outwardly and rearwardly to a firing position entirely externally of said body portion whereby said rack may be thereby disposed entirely in the airstream adjacent said aircraft body portion for increased aerodynamic drag effects and to be entirely clear of said body portion, said tubes being arranged for selective firing from any tube of said rack.

2. In an aircraft, a body portion comprising a housing, an ordnance mounting carriage, means mounting said carriage upon said aircraft to move between a retracted position within said housing and an extended position externally thereof so as to be thereby disposed in the airstream adjacent the aircraft for increased aerodynamic drag purposes and to be clear of said body portion for combat action, and means controlling such movement of said carriage so as to alter the attitude of the latter between parallel and non-parallel positions relative to the aircraft thrust line incidental to movement of the carriage between said extended and retracted positions respectively, said last-named means comprising a pair of bell cranks mounted on separate axes in said body portion in fore and aft relation to said carriage and connected thereto so as to swing outwardly and rearwardly for moving said carriage from said retracted position to said extended position, such rearward swinging movement enabling utilization of the adjacent air stream to assist in moving said carriage to extended position.

3. In an aircraft, a body portion comprising a housing, a rack carrying multiple rocket launching tubes, means mounting said rack upon said aircraft to move between a first position within said housing behind structural elements of said aircraft and a second position entirely external of said body portion, said second position being in the adjacent airstream for increased aerodynamic drag pressures and being entirely clear of said body portion for firing from any tube of said rack, and means controlling such movement of said rack to alter the attitude thereof relative to the aircraft thrust line between parallel and non-parallel positions incidental to movement of said rack between said second and said first positions respectively, said last named means comprising a pair of bell cranks mounted on separate axes in said body portion in fore and aft relation to said rack and connected thereto so as to swing outwardly and rearwardly for moving said rack from said first position to said second position, such rearward movement enabling utilization of the adjacent air stream to assist in moving said rack to said second position.

4. In an aircraft, a body portion comprising housing means, a pair of armament carriages, means mounting said carriages upon said body portion at opposite sides of said aircraft for movement from stowed positions within said housing means outwardly and rearwardly to firing positions equally and entirely external of said aircraft at opposite sides thereof, and means for simultaneously so moving said carriages, said carriages when in firing position being placed with their centers of drag arranged to produce mutually cancelling aircraft turning moments whereby said carriages are thereby disposed in the airstream adjacent said aircraft body portion for universally balanced airspeed brake effects, and said carriages swinging rearwardly whereby to utilize the force of the adjacent air stream in such movement.

5. In an aircraft, a body portion comprising housing means, a pair of ordnance mounting carriages, means mounting each of said carriages upon said body portion to move between retracted position within said housing means and extended position equally externally thereof and at opposite sides thereof so as to be thereby disposed in the airstream adjacent the aircraft for increased aerodynamic drag purposes and to be clear of said body portion for combat action and means associated with each carriage for controlling such motion of said carriages to alter the attitude of the latter between parallel and non-parallel positions relative to the aircraft thrust line incidental to movement of the carriages between said extended and retracted positions respectively, each of said last-named means comprising a pair of bell cranks mounted on separate axes in said body portion in fore and aft relation to a carriage so as to swing outwardly and rearwardly for moving said carriage from its retracted position to its extended position, such rearward movement enabling utilization of the adjacent air stream to assist in moving said carriage to extended position.

6. In an aircraft, a body portion comprising a housing, a rocket rack including multiple rocket launching tubes arranged in parallel relation free from interference with each other for independent firing thereof, and means mounting said rack upon said aircraft to move from a stowed position within said housing outwardly and rearwardly to a firing position entirely externally of said body portion whereby said rack is entirely clear of said body portion for selective firing from any of said launching tubes, said tubes being and remaining open and unobstructed for free passage of air therethrough after the firing of the rockets mounted therein, whereby the aerodynamic drag effect produced by said rocket rack in firing position decreases upon firing of the rockets carried therein.

7. In an aircraft, a body portion including a housing, a rocket launching device, and means mounting said device upon said aircraft to swing outwardly and rearwardly from a stowed position within said housing to a launching position entirely externally of said body portion for rocket launching purposes, said launching device swinging rearwardly to utilize the force of the adjacent air stream in moving said device to launching position and including a cover member for said housing conforming with the outer surface of said body portion adjacent said housing when said device is in stowed position whereby to preserve the streamlining of said body portion.

References Cited in the file of this patent

UNITED STATES PATENTS

| | | |
|---|---|---|
| 1,698,326 | Vold et al. | Jan. 8, 1929 |
| 2,167,561 | Amiot | July 25, 1939 |
| 2,250,240 | Steuerlein | July 22, 1941 |
| 2,409,210 | Jolly | Oct. 15, 1946 |
| 2,440,723 | Macdonald | May 4, 1948 |
| 2,445,235 | Myers | July 13, 1948 |
| 2,451,745 | Jolly | Oct. 19, 1948 |
| 2,517,333 | Motley | Aug. 1, 1950 |

FOREIGN PATENTS

| | | |
|---|---|---|
| 428,934 | Great Britain | May 15, 1935 |
| 553,704 | Great Britain | June 2, 1943 |
| 554,434 | Great Britain | July 5, 1943 |
| 556,933 | Great Britain | Oct. 26, 1943 |
| 411,576 | Italy | Jan. 18, 1945 |
| 585,564 | Great Britain | Feb. 11, 1947 |
| 924,013 | France | July 24, 1947 |